Oct. 10, 1933.  H. W. FORCE  1,929,415
MANUFACTURE OF WELDED SPIRAL PIPE
Filed April 21, 1930
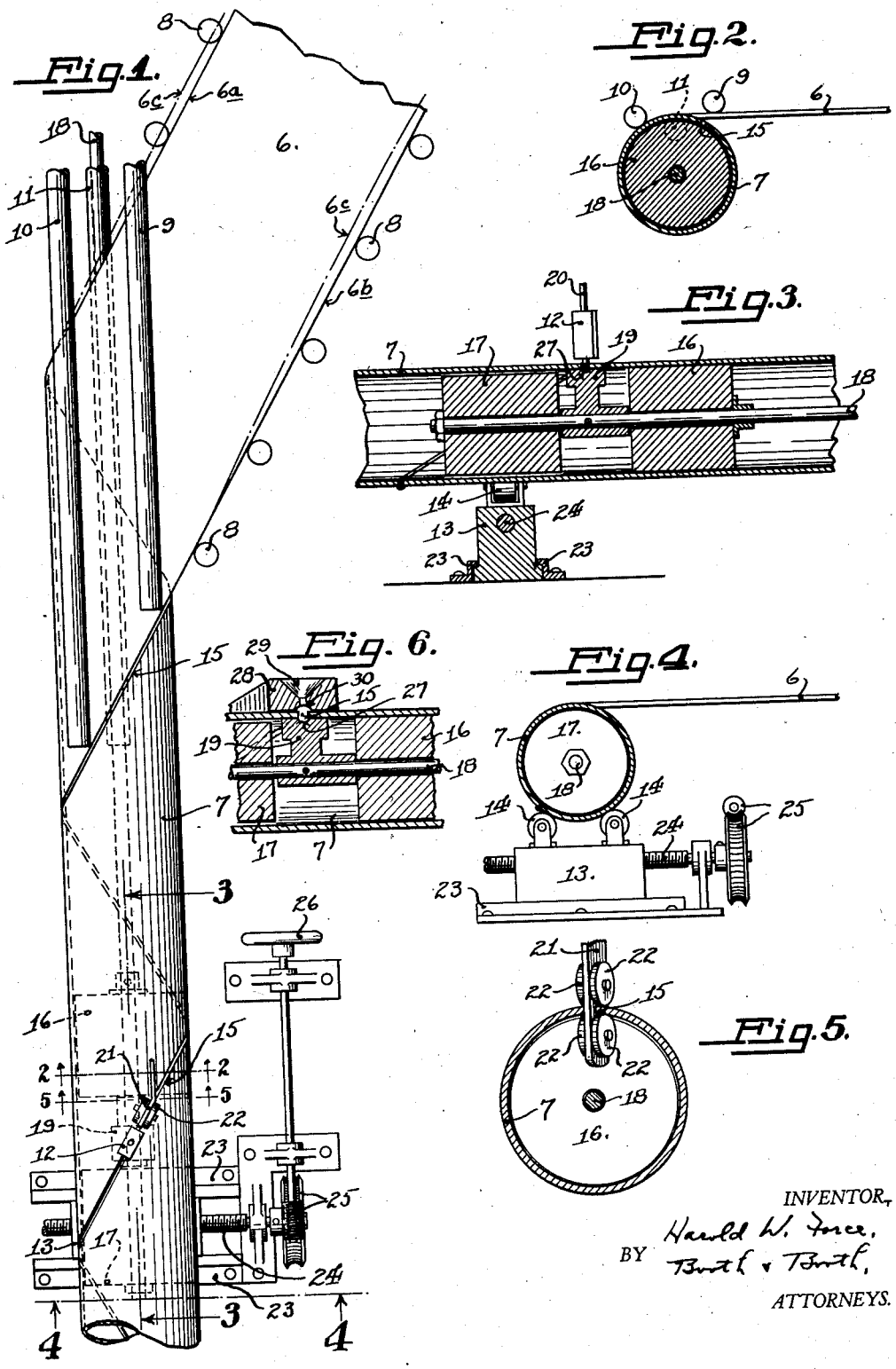
INVENTOR,
Harold W. Force,
BY Burth & Burth,
ATTORNEYS.

Patented Oct. 10, 1933

1,929,415

UNITED STATES PATENT OFFICE 1,929,415

MANUFACTURE OF WELDED SPIRAL PIPE

Harold W. Force, Oakland, Calif., assignor to California Corrugated Culvert Co., Berkeley, Calif., a corporation of California Application April 21, 1930. Serial No. 445,917

2 Claims. (Cl. 113—35)

The present invention relates to the art of making spiral welded metallic pipe.

Its principal object is to provide for the rapid formation of a perfect welded helical seam between the adjacent edges of the wound sheet or strip. A secondary object is to compensate for accidental variations in the width of the incoming sheet or curvature of its edges. Sheets or strips of steel of the character used in the manufacture of spiral pipe, as received from the rolling mill, frequently have a slight lateral camber or curvature which interferes with the proper registry of the edges of the sheet when wound helically into tubular form.

It is well known that a continuous welding operation for uniting the edges of two sheets of metal can be carried on with greater speed and more successful results if the edges to be welded are kept separated enough to allow the welding flame to penetrate between them to the full depth or thickness of the sheets. This permits a more rapid and even heating of the edges, and when the space is filled with molten metal supplied within the heating area, results in a rapidly formed weld of great evenness and strength. By means of the present invention, I am able to secure these advantages in the manufacture of continuous spiral pipe by maintaining a space between the adjacent edges of the incoming sheet as it is helically wound into tubular form, and by filling said space with molten metal during the welding operation.

A still further object is to provide for the formation of a raised or thickened weld, form'ng a helical reinforcing rib around the pipe, which may project slightly beyond its surface on either the outside or inside, or both.

These and other objects and advantages of the invention will become apparent from the following description, which should be read with the understanding that the form, construction and arrangement of the several parts illustrated in the accompanying drawing may be varied within the limits of the claims hereto appended without departing from the spirit of the invention as expressed therein.

A preferred apparatus for carrying out the invention is illustrated more or less diagrammatically in the accompanying drawing, in which Fig. 1 is a plan view.

Fig. 2 is a transverse section taken on the line 2—2 of Fig. 1.

Fig. 3 is a longitudinal section taken on the line 3—3 of Fig. 1.

Fig. 4 is a transverse section taken on the line 4—4 of Fig. 1.

Fig. 5 is a transverse section taken on the line 5—5 of Fig. 1 and enlarged.

Fig. 6 is a longitudinal sectional detail similar to Fig. 3, illustrating an alternative welding means.

In the drawing the reference numeral 6 designates the sheet or strip of metal which is wound helically to form a tube or pipe 7. Any suitable guide means, indicated as rollers 8, may be employed for guiding the sheet 6 at the proper angle to the bending or winding means, which is illustrated conventionally as comprising three parallel rollers 9, 10, and 11, the first two bearing against the outside or top of the sheet, and the last against the inside or bottom. By means of the rollers 9, 10 and 11, the sheet is bent or wound helically into tubular form with its rear edge 6a adjacent its forward edge 6b. The tube thus formed slides off the bending rollers 9, 10 and 11 endwise, impelled by the combined action of said bending rolls and the guide rollers 8, and the adjacent edges of its helical seam are united by a suitable welding instrumentality, indicated at 12, to form a rigid pipe. The end or finished poriton of the pipe is supported by a suitable guide 13 preferably provided with rollers, as indicated at 14.

The adjacent edges of the wound sheets are spaced apart slightly, as indicated at 15. This may be accomplished in a number of ways, which may be used singly or in combination as circumstances may direct. The angular relation between the incoming sheet and the axes of the bending rollers may be so adjusted with reference to the width of the sheet that said sheet is bent into tubular form with a space between its edges, that is to say, with its adjacent convolutions slightly spaced apart. It is more practicable, however, to wind the sheet initially in such a manner that its convolutions tend to lie closely together, and then to hold them apart positively by means distinct from the bending means. As one example of means for holding the convolutions of the wound sheet apart, that is for maintaining a space or open seam between its adjacent edges, I have shown a pair of plugs or cylinders 16 and 17 positioned within the formed tube, and of a diameter sufficient to maintain its seam 15 slightly spread. The plugs 16 and 17 are free to rotate with the tube, but are prevented from traveling endwise with it by a fixed central rod 18.

The welder 12 may be located at any point between the point of first meeting of the edges 6a and 6b, and the end of the plug 17. A convenient position for the welder is between the two plugs 16 and 17. A suitable backing or support member 19 may be secured to the rod 18 between said plugs to prevent the molten metal from falling through the open seam into the interior of the pipe during the welding operation. The welder is of a type provided with a metal weld rod 20 which is understood to be capable of continuous feeding into the welding flame to supply the extra metal necessary to fill the open seam.

A second means for maintaining an open seam of constant width, which may be used either alone or in combination with the plugs described above, and which is best positioned immediately in advance of the the welder 12, is illustrated in Figs. 1 and 5 as a plate or guide 21 extending through the seam 15 and secured in place by any suitable connection, not shown, with a fixed support. Rollers 22 are preferably provided, mounted upon the guide 21, and bearing against the edge portions of the wound sheet to maintain said edges in alignment.

The pipe support 13 is preferably mounted for transverse adjustment in suitable guides 23, and is provided with means, shown in the drawing as a screw 24 operated by a worm 25 and hand wheel 26, for moving it transversely of the axis of the pipe. This adjustable support may be used either alone or in combination with the other means previously described to maintain the open seam 15, for by shifting said guide slightly to the left as viewed in Fig. 1, a tendency will be exerted upon the formed pipe to spread its convolutions apart. It is understood that the rod 18 holding the plugs 16 and 17 is sufficiently flexible to permit the necessary slight lateral displacement of the pipe.

The adjustable pipe support 13 also provides a means for compensating for accidental variations in the width of the sheet 6 or curvature of its edges as indicated by the broken lines 6c. Any such camber or variation in width of the sheet would produce a variation in the width of the space between the adjacent edges of the seam of the wound tube, and would, therefore, affect the character of the weld uniting said edges. By shifting the support 13, however, to one side or the other, the width of the open seam can be maintained constant.

It is frequently desirable to make a thickened joint or weld between adjacent convolutions, thereby forming a helical reinforcing rib around the pipe, which may project slightly beyond the surface, either on the outside or inside, or both. An exteriorly raised or thickened weld can be made by proper control of the welding flame and feeding of the weld rod 20, and an interiorly raised weld can be formed by providing the backing or support member 19 with a helically directed depression or groove 27, as indicated in Fig. 3, thereby permitting the molten metal to flow through the open seam into said groove to form a ridge on the inside of the pipe.

An alternative method of welding the adjacent convolutions together is illustrated in Fig. 6. This method also permits the formation of a thickened weld if desired, and is so illustrated. Instead of using the welder 12 described above, a portion of the open seam 15 between adjacent convolutions is covered by an exterior mold 28, which may extend along said seam for as great a distance as may be necessary. A pouring aperture 29 is provided in said mold, through which molten metal is introduced to fill the seam 15 and unite its edges. Preheating of said edges should be done in any well known manner. If a thickened weld is desired, the mold 28 is provided with a helically directed groove 30 following and lying above the seam 15. The backing member 19 may also be provided with a helically directed groove 27, as before, if a rib is desired on the inside of the pipe.

By winding the pipe with an open seam between its convolutions and by maintaining said seam at a constant width, I am able to carry on the operation at a greater speed than is possible when the convolutions are in contact, and to produce a more perfect and even weld, and to make a raised or thickened weld if such be desired.

I claim:—

1. An apparatus for making spiral welded pipe comprising means for helically winding a sheet of metal into tubular form, means for varying the angular relation between the finished portion of the pipe and its axis of winding to maintain a constant space between its convolutions, and means for filling said space entirely with molten metal, said molten metal fusing with the edges of said convolutions to form a welded seam.

2. An apparatus for making spiral welded pipe comprising means for helically winding a sheet of metal into tubular form at an angle designed to position its convolutions close together, guide means bearing against the finished portion of the pipe for shifting it out of alignment with the axis of winding to open and maintain a space between said convolutions, and means for welding said convolutions together by filling said space with molten metal.

HAROLD W. FORCE.